United States Patent [19]

Yokoyama et al.

[11] Patent Number: 4,659,205
[45] Date of Patent: Apr. 21, 1987

[54] AUTOMATIC FOCUSING APPARATUS

[75] Inventors: Shotaro Yokoyama; Takashi Nishibe, both of Yokosuka, Japan

[73] Assignees: Fuji Electric Corporate Research & Development Co. Ltd.; Fuji Elec. Co. Ltd., both of Kanagawa, Japan

[21] Appl. No.: 483,247

[22] Filed: Apr. 8, 1983

[30] Foreign Application Priority Data

Apr. 30, 1982 [JP] Japan .................................. 57-71501

[51] Int. Cl.$^4$ ............................ G03B 3/00; G01J 1/36
[52] U.S. Cl. .................................... 354/408; 354/406; 354/407; 250/204
[58] Field of Search .................. 250/201, 204; 356/1, 356/4; 354/400–409

[56] References Cited

U.S. PATENT DOCUMENTS

| 4,176,928 | 12/1979 | Nakamura et al. | 354/407 |
| 4,180,309 | 12/1979 | Miyata et al. | 354/407 |
| 4,230,401 | 10/1980 | Tokutomi et al. | 354/409 |
| 4,492,499 | 1/1985 | Oinoue | 354/407 |

Primary Examiner—Russell E. Adams
Attorney, Agent, or Firm—Brumbaugh, Graves, Donohue & Raymond

[57] ABSTRACT

Disclosed is an automatic focusing system for optical imaging equipment, such as a camera, which includes a relative image displacement detection system providing first and second digital quantities indicative of the direction in which the focus of the imaging system is to be altered to achieve focus and the magnitude of such alterations, respectively, and an image contrast detection system providing a third digital quantity indicative of the change in the contrast of an image formed by the imaging system as the focus thereof is altered. In addition, the apparatus includes a servomotor for altering the focus of the imaging system and a motor control circuit which receives the first, second and third digital quantities and provides motor control signals to the servomotor. The motor control circuit initially responds to the first and second digital quantities from the relative image displacement detector and provides appropriate motor control signals for altering the focus of the imaging system under the control of the relative image displacement detection system until the change in image contrast as indicated by the third digital quantity becomes negative. Thereafter, the motor control circuit responds to the third digital quantity and provides appropriate motor control signals to alter the focus of the imaging system under the control of the image contrast detection system until the magnitude of the third digital quantity becomes less than a predetermined value.

9 Claims, 13 Drawing Figures

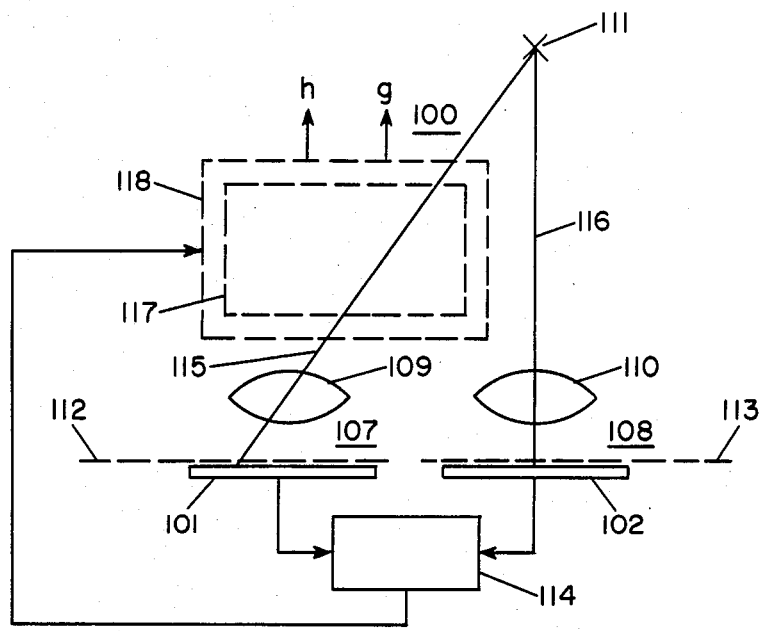
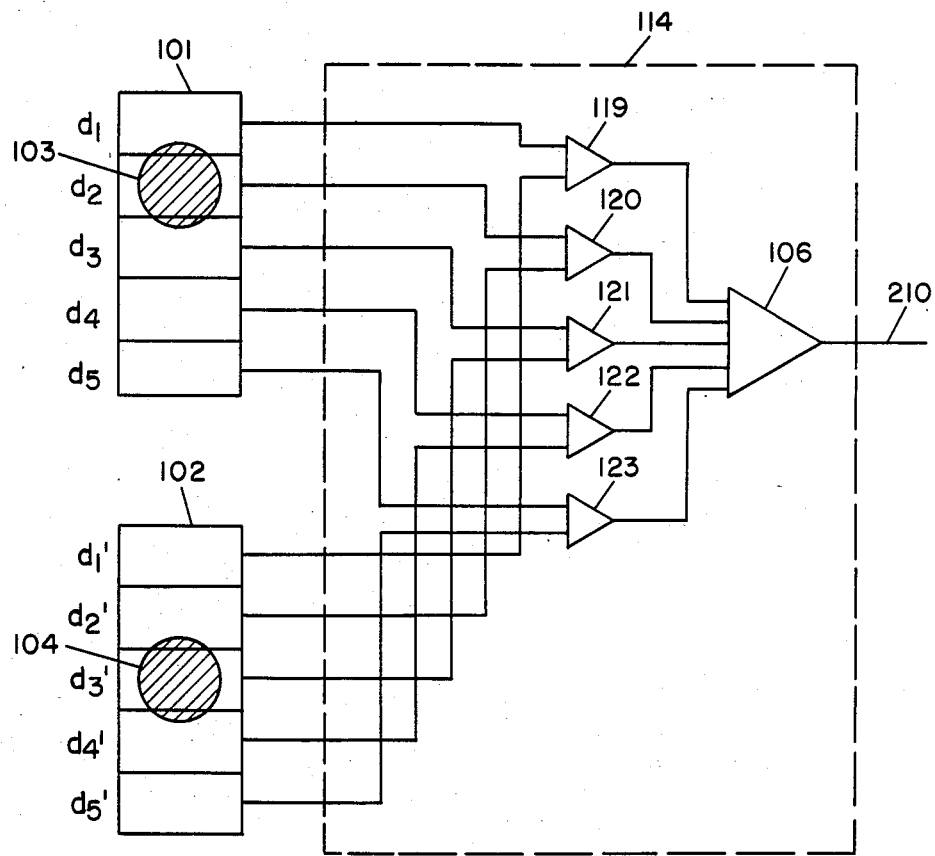
FIG. 1
FIG. 2

AUTOMATIC FOCUSING APPARATUS

BACKGROUND OF THE INVENTION

The present invention relates to automatic focusing apparatus, and more particularly to automatic focusing apparatus which uses two different types of focus detectors.

Apparatus for automatically focusing an image of an object formed by an optical system, such as a lens, are known and are used in various types of optical imaging equipment, such as self-focusing cameras. Such apparatus generally operate by detecting the degree of focus of the image 10 in the focal plane of the imaging system and by appropriately altering the focus of the optical system, usually with a servomotor, to maximize the degree of focus. One known technique for detecting focus is by monitoring with photosensors the relative displacement of two images of the same object formed by two optical systems through two different optical paths. The relative image displacement technique of focus detection is illustrated in FIGS. 1 and 2. Referring now to FIG. 1, there is shown schematically a focus detection system 100 based on the relative image displacement technique. The apparatus includes two optical imaging systems 107 and 108 each comprising a lens 109 and 110 for forming an image of an object 111 in a respective focal plane 112 and 113. Situated in the focal plane of each imaging system is an array of photosensors 101 and 102. Each photosensor in the array is adapted to sense the light intensity in a respective portion of the focal plane and to provide an electrical signal which is representative of the sensed light intensity. The signals from the photosensors in the two arrays 101 and 102 are provided to a relative image displacement detection circuit 114.

The image of the object 111 formed by the imaging system 107 is displaced relative to the one formed by the imaging system 108, owing to the differences between the optical paths 115 and 116 through which the images are respectively formed. The optical path 116 is coincident with the optical axis of the lens 110. As such, the image formed by the imaging system 108 is centered on the photosensor array 102. By contrast, the optical path 115 is at an angle with respect to the optical axis of the lens 109. Consequently, the image formed by the imaging system 107 is shifted to the left of the photosensor array 101. However, the angle between the optical path 115 and the optical axis of the lens 109 can be altered by means of a suitably shaped prism 117 in the optical path 115. Therefore, the relative displacement between images formed by the imaging systems 107 and 108 can be eliminated by an appropriate rotation of the prism 117. In the system of FIG. 1, the rotation of the prism 117 to eliminate the relative image displacement is accomplished by means of a servosystem 118 which receives a displacement signal from the image displacement detection circuit 114. The servosystem 118 provides the quantities g and h, which represent the sense and magnitude of rotation of the prism 117 required to eliminate the relative image displacement. The quantities g and h, which are derived from conventional encoding circuits within the servosystem 118, can in turn be used to alter the focus of an objective lens in the imaging equipment by means of another appropriate servosystem.

Turning now to FIG. 2, there is depicted a schematic diagram of the photosensor arrays 101 and 102 and the image displacement detection circuit 114 of the apparatus of FIG. 1. For purposes of illustration, the photosensor arrays 101 and 102 each comprise five photosensors $d_1-d_5$ and $d_1'-d_5'$ respectively. The image 104 being sensed by the array 102 is shown as being centered in that array, while the image 103 being sensed by the array 101 is shown as being shifted towards one end of the array. The outputs of corresponding pairs of photosensors from each array are provided to respective differential amplifiers 119-123. The outputs of the differential amplifiers 119-123 are received by a summing circuit 106, which provides an output signal representative of the degree of relative displacement of the images sensed by the photosensor arrays 101 and 102.

The relative image displacement focus detection technique is advantageous in that it can be used to control automatic focusing apparatus even when the imaging equipment is far out of focus. However, the relative image displacement technique has the problem in that it lacks sufficient accuracy for fine focusing of the imaging equipment, particularly when the image has a repetitive pattern such as a striped or checkered pattern.

Another known technique for detecting focus in imaging equipment is to monitor the contrast of the image (i.e., the relative intensities of different portions of the image) with an array of photosensors arranged in the focal plane of the imaging equipment. According to the contrast detection technique, focus of an image is obtained when the contrast of the image, as detected by the photosensor array, is maximized. The contrast detection technique is advantageous in that it provides highly accurate focusing. However, this technique has the problem in that it cannot be used to control automatic focusing apparatus when the imaging equipment is far out of focus, since the contrast of an image falls off rapidly to zero as the image goes out of focus.

Therefore, a need exists for an automatic focusing apparatus which provides accurate focusing of imaging equipment, and yet can be used to control focusing even when the imaging equipment is far out of focus.

SUMMARY OF THE INVENTION

Accordingly, the problems of the prior art discussed above are substantially improved by the present invention which is an automatic focusing apparatus for an imaging system, such as a camera, comprising a relative image displacement focus detection system providing first and second digital quantities indicative of the direction in which the focus of the imaging system is to be altered to achieve focus and the magnitude of such alterations, respectively, and an image contrast detection system providing a third digital quantity indicative of the change in the contrast of an image formed by the imaging system as the focus thereof is altered. In addition, the apparatus includes a servomotor for altering the focus of the imaging system and a motor control circuit which receives the first, second and third digital quantities and provides motor control signals to the servomotor. The motor control circuit initially responds to the first and second digital quantities from the relative image displacement detection system and provides appropriate motor control signals for altering the focus of the imaging system in accordance with the first and second digital quantities until the third digital quantity from the image contrast detection system becomes negative. Thereafter, the motor contral circuit responds to the third digital quantity and provides appropriate motor control signals to alter the focus of the imaging system in accorance with the third digital quantity until the magnitude thereof becomes less than a predetermined value.

BRIEF DESCRIPTION OF THE DRAWINGS

FIG. 1 is a schematic illustration of a relative image displacement focus detection apparatus;

FIG. 2 is a schematic diagram depicting the photosensor arrays and the image displacement detection circuit used in the apparatus of FIG. 1;

DETAILED DESCRIPTION

Figure 3:
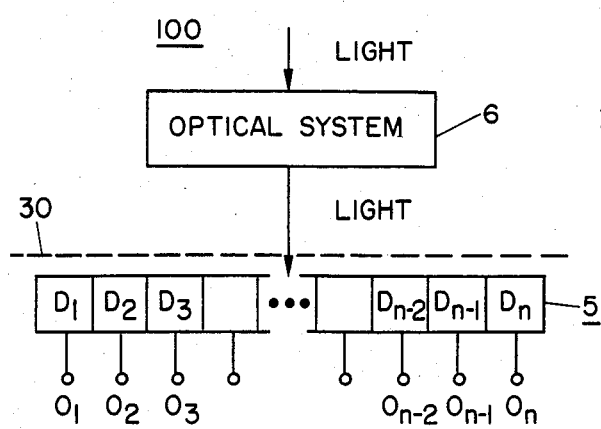
FIG. 3 is a diagram schematically illustrating an optical imaging system and an array of detector/converter elements situated in the focal plane of the imaging system.

Referring now to FIG. 3, there is shown an imaging system 100 comprising an optical system 6 adapted to form the image of an object (not shown) at a focal plane 30 thereof (represented in two-dimensions in the depiction). The optical system may be a conventional arrangement of refracting or reflecting optical components for projecting light reflected from the object onto the focal plane at an appropriate magnification. The details of the optical system are not important to the present invention except that the focus of the optical system must be alterable by some appropriate means. Typically, the focus of a conventional optical system is altered by moving one or more of the optical components of the system closer to or further away from the focal plane of the imaging system. According to the present invention, an image contrast detection system which includes an array 5 of n (n is a relatively large whole number) detector/converter elements $D_1$-$D_n$ is positioned at the focal plane of the imaging system is used. Each of the detector/converter elements $D_1$-$D_n$ senses the light in a respective portion of the image at the focal plane and provides a pulsed signal at its output, the pulsed signal having a pulse-width which is related to the intensity of the light sensed. Although the array 5 of detector/converter elements is represented as being two-dimensional in the figures, it is contemplated that a three-dimensional array will be used in many cases.

Figure 4:
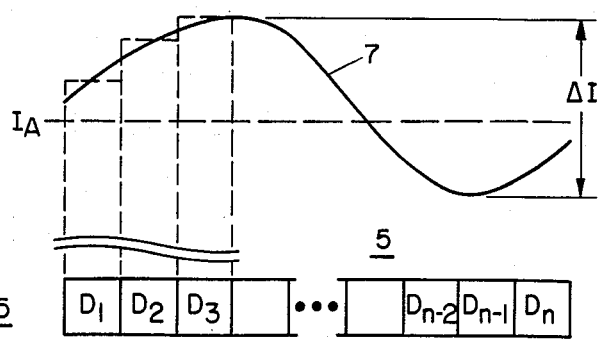
FIG. 4 is a two dimensional graphical representation of the intensity distribution of an exemplary image as detected by an array of detector/converter element in the focal plane of the imaging system.

Turning now to FIG. 4 there is shown a curve 7 which is a two-dimensional representation of the intensity distribution of an exemplary image at the focal plane. The same reference numerals used in FIG. 3 are again used on FIG. 4 to denote like components or parts of the apparatus. Each of the detector/converter elements in the array 5 is arranged to sense the average light intensity in a respective portion of the image, the average intensity being represented by the bars drawn in broken lines. In automatic focusing apparatus based on image contrast detection, the degree of focus of an image is determined by the detection of the contrast of the image, and the image is deemed to be in focus when the contrast of the image is maximized. The contrast of an image is defined as the difference in light intensity between the brightest and the darkest portions of the image, and may be represented graphically by the quantity $\Delta I$ in FIG. 4. The quantity $\Delta I$ will be relatively small when the image is out of focus but will have its maximum value when the image is in focus. Since the detector/converter elements in the array 5 provide pulsed signals having pulse-widths which are related to the light intensity in respective portions of the image, the difference between the maximum and minimum pulse-widths of the pulses is related to the quantity $\Delta I$ and, therefore, is also indicative of the degree of focus of the image.

Alternatively, the array of detector/converters of the image contrast detection system may be replaced by an array of photosensors, each of which sensing the light intensity in a respective portion of an image and providing a voltage approximately proportional to the sensed light intensity. Such photosensors may comprise a reverse-biased photodiode connected in series with a resistance between a voltage supply and ground, the output voltage of such a photosensor being the voltage drop across the resistance. Therefore, if the array comprises n photosensors $S_1$-$S_n$ providing output voltages $V_1$-$V_n$, respectively, the square of the standard deviation $\sigma^2$ is indicative of the contrast of an image sensed by the photosensor array. The square of the standard deviation may be expressed as $$\sigma^2 = \frac{1}{n} \sum_{i=1}^{n} (V_i - V_a)^2, \quad (1)$$

where $V_a$ is the output voltage of a photosensor receiving the mean light intensity $I_A$ of the image (see FIG. 4). The construction of a circuit for deriving the standard deviation of the output voltages $V_1$-$V_n$ of the photosensors $S_1$-$S_n$ will be known to those skilled in the art of circuit design.

Figure 5:
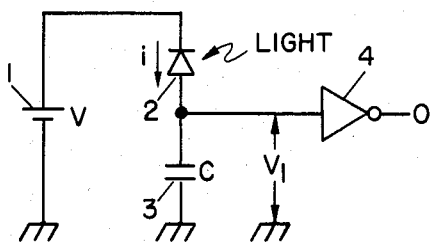
FIGS. 5(a) through (d) are schematic diagrams illustrating four alternative circuit configurations for the dectector/converter element, which senses light and provides a pulse having a pulse-width approximately inversely proportional to the intensity of the sensed light.
Figure 5:
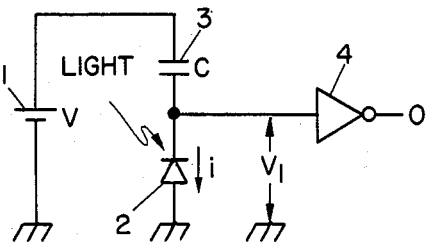
Figure 5:
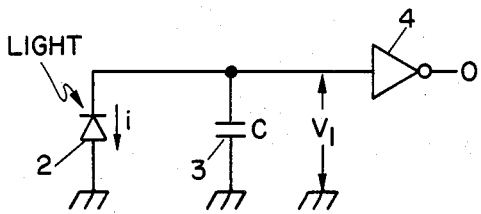
Figure 5:
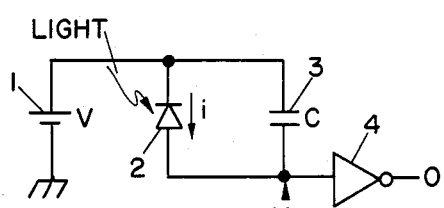

Referring now to FIG. 5, there are shown schematic diagrams of four alternative circuit configurations (a) -(d) for the detector/converter element in accordance with the present invention. Each configuration includes a photodiode 2, a capacitance 3 connected to the photodiode and an inverter 4 connected to the common node between the photodiode 2 and the capacitance 3. Upon receiving light, the photodiode conducts a photocurrent i, which is approximately proportional to the intensity of the light received. In circuit (a), the photodiode is connected between a voltage supply 1 and the capacitance 3. The other terminal of the capacitance 3 is connected to ground. The capacitance 3 is initially discharged by switching means connected across the capacitance. For simplicity of the depiction, the switching means, which may for example be a field-effect transistor, is omitted from the figure. The use of such switching means to establish an initial state in a digital circuit is well known. Under the above conditions, the input voltage $V_1$ of the inverter 4 is initially zero volts, and the output O of 15 the inverter is initially at a "high" logic level of approximately the supply voltage V. Owing to the light received by the photodiode 2, a photocurrent i flows through the photodiode to charge the capacitance 3 and cause the voltage $V_1$ to increase according to the relationship $$V_1 = (1/C) \int i \, dt. \qquad (2)$$

When the voltage $V_1$ exceeds the threshold voltage of the inverter 4, the output O of the inverter switches to a "low" logic level of approximately zero-volts. Thus, the circuit (a) provides a positive-going pulse having a pulse-width which is approximately inversely proportional to the light intensity received by the photodiode 2.

In circuit (b), the capacitance 3 is connected between the voltage supply 1 and the cathode of the photodiode 2. The anode of the photodiode is connected to ground. Initially, the capacitance is discharged by switching means coupled across the capacitance. Once again, for simplicity of the depiction, the switching means is omitted from the figure. Under the above conditions, the output O of the inverter is initially at a "low" logic level by virtue of the input voltage $V_1$ of the inverter being at the supply voltage V. Thereafter, the photocurrent i flowing through the photodiode 2 charges the capacitance causing $V_1$ to decrease. When $V_1$ drops below the threshold voltage of the inverter 4, the inverter output O switches to a "high" logic level. Thus the circuit (b) provides a negative-going pulse having a pulse-width which is approximately inversely proportional to the light intensity received by the photodiode 2.

In circuit (c), the photodiode 2 and the capacitance 3 are connected in parallel between the input of the inverter 4 and ground. The capacitance 3 is initially charged to the supply voltage V by switching means connected between the capacitance and the voltage supply. For simplicity of the depiction, both the switching means and the voltage supply are omitted from the figure. Under the above conditions, the output O of the inverter 4 is initially at a "low" logic level by virtue if its input voltage $V_1$ being initially at the supply voltage V. Thereafter, the photocurrent i flowing through the photodiode 2 causes the capacitance to discharge and the voltage $V_1$ to decrease. When the voltage $V_1$ drops below the threshold voltage of the inverter 4, the output O of the inverter goes to a "high" logic level. Thus, the circuit (c) provides a negative-going pulse having a pulse-width which is approximately inversely proportional to the light intensity received by the photodiode 2.

In circuit (d), the photodiode 2 and the capacitance 3 are connected in parallel between the voltage supply 1 and the input of the inverter 4. Initially the capacitance 3 is charged to the supply voltage V by switching means connecting the input of the inverter 4 to ground. Once again, for simplicity of the depiction, the switching means is omitted from the figure. Under the above conditions, the output O of the inverter is initiallly at a "high" logic level by virtue of its input voltage $V_1$ being initially at ground potential. Thereafter, the photocurrent i flowing through the photodiode 2 causes the capacitance 3 to discharge and the voltage $V_1$ to increase towards V. When the input voltage $V_1$ rises above the threshold voltage of the inverter 4, the output O switches to a "low" logic level. Thus, the circuit (d) provides a positive-going pulse having a pulse-width which is approximately inversely proportional to the intensity of light received by the photodiode 2.

Figure 6:
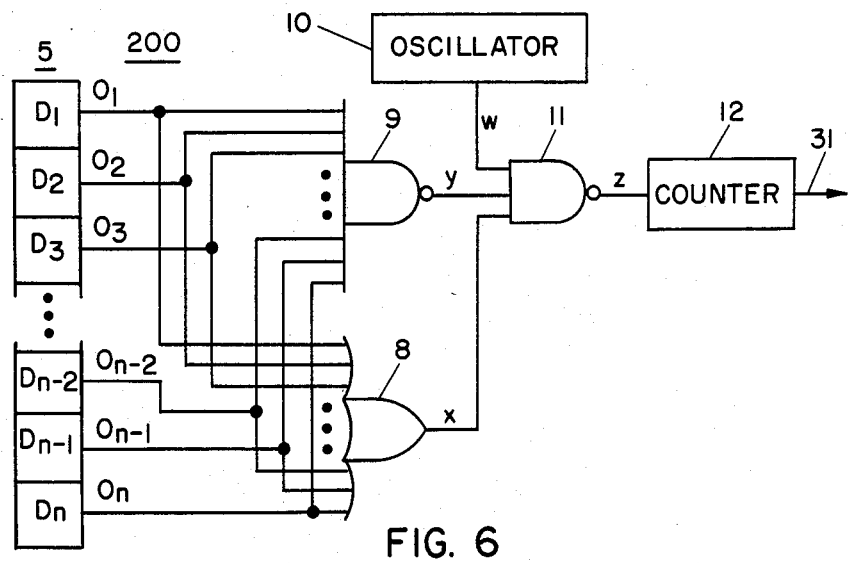
FIG. 6 is a schematic diagram of the detection circuit for deriving a digital quantity representative of the difference between the maximum and minimum pulse-widths of the pulses from the detector/converter elements.

Turning now to FIG. 6, there is shown a schematic diagram of a circuit 200 for receiving the signals from the outputs $O_1$-$O_n$ of the detector/converter elements $D_1$-$D_n$ and for deriving therefrom a digital quantity representative of the difference between the maximum and the minimum pulse-widths of the pulses provided by detector/converter elements. Reference characters and numerals used in FIGS. 3 and 4 are again used in FIG. 6 to denote like components and parts of the apparatus. The detector/converter elements $D_1$-$D_n$ have the circuit configuration (b) or (c) of FIG. 1 and provide negative-going pulses having pulse-widths which are approximately inversely porportional to the light intensities received by respective detector/converter elements. The signals from the outputs $O_1$-$O_n$ of the detector/converter elements $D_1$-$D_n$ are received by an n-input OR gate 8 and also by an n-input NAND gate 9. The outputs of gates 8 and 9 are received by a 3-input NAND gate 11, which also receives the output of an oscillator 10 providing a sequence of periodic clock pulses. The output of gate 11 is received by a counter which counts the clock pulses passed by gate 11 over a predetermined counting interval and provides its binary state at its output 31.

Figure 7:
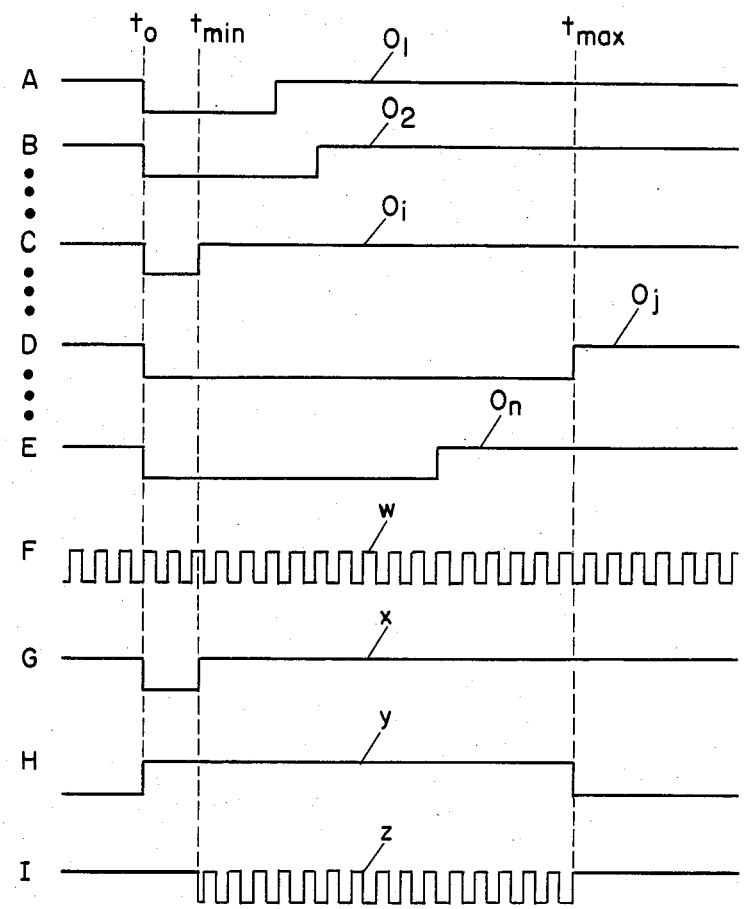
FIG. 7 are waveforms representative of the signals at certain nodes of the detection circuit of FIG. 6 and is explanatory of the operation of the detection circuit.

The operation of the circuit of FIG. 6 is now explained with the aid of FIG. 7, which shows the waveforms at certain nodes of the circuit of FIG. 6. Referring now to FIG. 7, waveforms A-E are exemplary of the outputs $O_1$-$O_n$ of the detector/converter elements $D_1$-$D_n$. For simplicity of the depiction, the waveforms of only five of the outputs $O_1$, $O_2$, $O_i$, $O_j$ and $O_n$ are illustrated in the present example. As may be seen from the waveforms A-E, at some initial time $t_o$, all of the detector/converter elements are initialized to have their outputs at "low" logic levels. Thereafter, the outputs return to a "high" logic level at different times depending on the light intensity received by the photodiodes in the respective detector/converter elements. It is noted that one of the outputs $O_i$ returns to the "high" logic level at a time $t_{min}$, before any of the other outputs, while another of the outputs $O_j$ returns to the "high" logic level at a time $t_{max}$, later than all the other outputs. Therefore, in the present example, outputs $O_j$ and $O_i$ provide pulses with the maximum and minimum pulse-widths, respectively.

Waveform F represent the periodic clock pulses provided by the oscillator 10. It is preferred that the period of the clock pulses be relatively short compared to $t_{min}$.

Waveform G represents the output of the n-input 0R gate 8. It is noted that the output of gate 8 goes to a "low" logic level at $t_o$ when all of its inputs ($O_1$-$O_n$) go to a "low " logic level. The outputs of gate 8 returns to a "high" logic level at $t_{min}$ when one of its inputs ($O_i$) goes to a "high" logic level.

Waveform H represents the output of the n-input NAND gate 9. The output of gate 9 goes to a "high" logic level at $t_o$ when all of its inputs ($O_1$-$O_n$) to a "low"

logic level. The output of gate 9 returns to a "low" logic level at $t_{max}$ when all of its inputs ($O_1$-$O_n$) are at a "high" logic level.

Waveform I represents the output of the 3-input NAND gate 11. It is noted that gate 11 passes the clock pulses provided by the oscillator 10 during the time interval between $t_{min}$ and $t_{max}$. At $t_{min}$ gate 11 is enabled to pass the clock pulses by virtue of the outputs of gates 8 and 9 both being at "high" logic levels. Gate 11 is disable at $t_{max}$, when the output of gate 9 goes to a "low" logic level. Therefore, the number of clock pulses passed by gate 11 provides a measure of the difference between $t_{max}$ and $t_{min}$. The number of clock pulses passed by gate 11 are counted by the counter 12 during a predetermined counting interval which begins before $t_{min}$ and ends after $t_{max}$. The counter 12, therefore, provides a digital quantity (i.e., its binary state at the end of the counting interval) at its output 31 indicative of the difference between $t_{max}$ and $t_{min}$.

Figure 8:
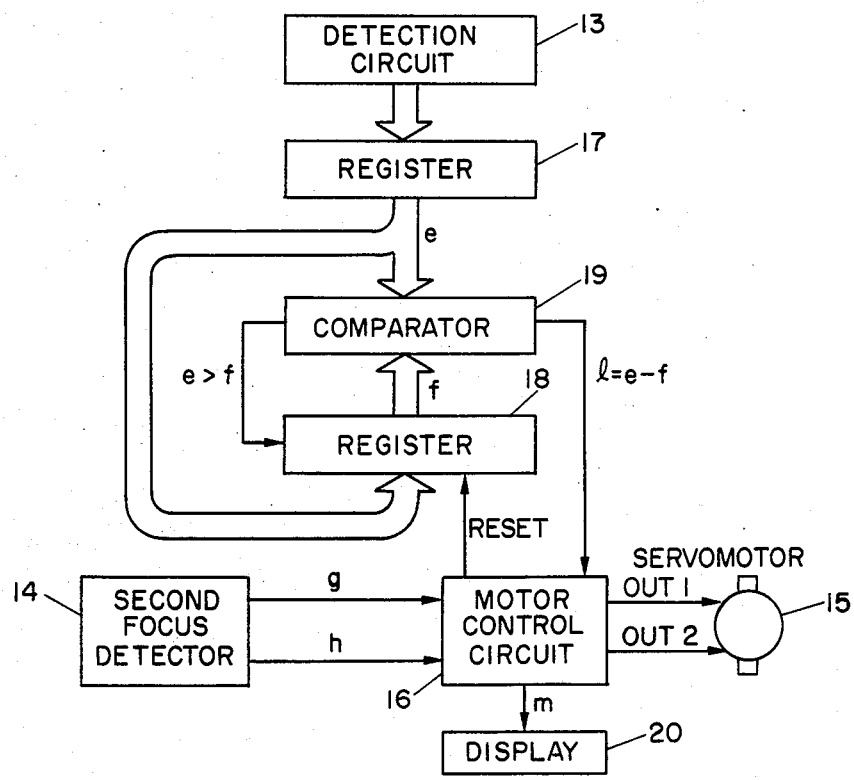
FIG. 8 is a schematic block diagram of an automatic focusing apparatus according to the present invention.

Turning now to FIG. 8, there is shown a block diagram of an automatic focus apparatus according to an illustrative embodiment of the present invention. Block 13 represents the detection circuit illustrated in FIG. 6. The binary state of the counter 11 of the detection circuit after the most recent counting interval is stored in a register 17. Another register 18 stores the counter state from a previous counting interval. A comparator 19 compares the contents e of register 17 with the contents f of register 18 and provides a digital output to a motor control circuit 16. The quantity is equal to the difference between the quantities e and f. If the quantity in register 17 is larger than the quantity in register 18, the comparator also causes the contents of register 17 to be transferred to register 18, where it is stored for a subsequent comparison operation. Thus at the end of a focusing operation, the register 18 stores a digital quantity which represents the maximum difference between $t_{max}$ and $t_{min}$, before the register 18 is reset by a RESET signal from the motor control circuit 16. An automatic focusing apparatus using the above-identified image contrast detection system is disclosed and claimed in a commonly assigned, copending U.S. patent application bearing Ser. No. 483,248 filed contemporaneously with the present application.

The apparatus of FIG. 8 also includes a second focus detection system 14 of the relative image displacement detection type, such as that described in FIGS. 1 and 2. An alternative configuration for a relative image displacement detection system is disclosed in a commonly assigned, copending U.S. patent application bearing Ser. No. 483,362, filed contemporaneously with the present application. The second focus detection system 14 is used for rough focusing of the image, while the detection circuit 13 is used for fine focusing of the image. To the extent permissible, it is advantageous that the two focus detection systems 13 and 14 share common optical components and photodetectors. The second focus detector 14 provides signals g and h indicative of the direction in which the focus of the optical system is to be altered to bring the image into focus and the magnitude of such alteration, respectively. The signals g and h are both received by motor control circuit 16.

Prior to a focusing operation the register 18 is reset by a RESET signal from the motor control circuit 16. The servomotor 15, which alters the focus of the optical system is initially controlled via the motor control circuit 16 by the signals g and h from the second focus detector. The motor control circuit 16 provides a signal m to a display 20 for indicating the state of focus of the system. The operation of the servomotor continues in one direction under the control of the quantities g and h until the quantity l from the comparator 19 becomes negative. Thereafter, the motor control circuit causes the servomotor to reverse its direction, and the focusing operation continues in the opposite direction under the control of the quantity ( until the magnitude of the quantity l becomes smaller than a predetermined value, such as zero or a very small number. At that point the focusing operation is completed.

Figure 9:
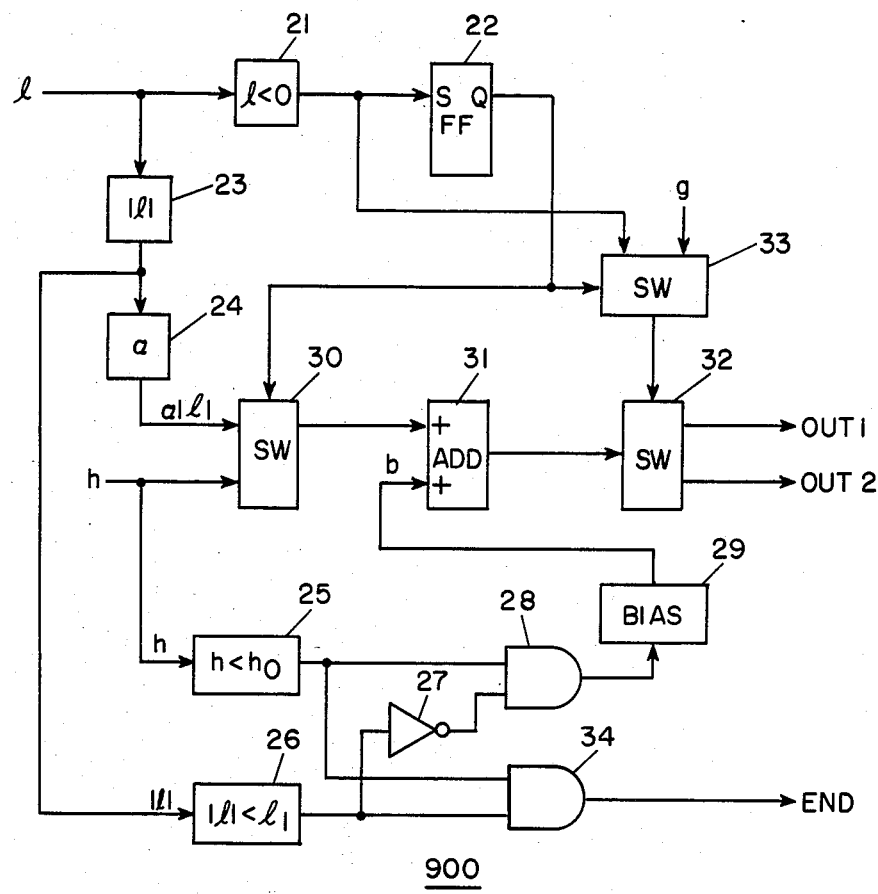
FIG. 9 is a schematic block diagram of a motor control circuit suitable for use in the automatic focusing apparatus of FIG. 8.

Referring now to FIG. 9, there is shown a schematic block diagram of a motor control circuit 900 suitable for use in the automatic focusing apparatus of FIG. 8. The digital quantity l from the image contrast detection system is applied to a comparator 21 which provides a "low" logic level if $l \geq 0$ but provides a "high" logic level if $l < 0$. The output of the comparator 21 is received by the S input of a S-R flip-flop 22 which provides a "high" logic level at its output Q when it is set by a "high" logic level from the comparator 21. Once set, the output of flip-flop 22 remains at a "high" logic level until the flip-flop is reset at the beginning of another focusing operation.

The digital quantity is also provided to an absolute value circuit 23 which provides the absolute value of $l(|l|)$ at its output. The output of the absolute value circuit 23 is received by a scaling circuit 24 which multiplies the quantity l by a scale factor $\alpha$. The reason for multiplying the quantity l the scale factor $\alpha$ is to compensate for the difference in magnitude between the output h of the relative image displacement detection system and the output l of the image contrast detection system. The output of the scaling circuit 24 is received by a switch 30 along with the digital quantity h from the relative image displacement detection system. The switch 30 is controlled by the output Q of the flip-flop 22, such that the switch 30 provides the quantity h when Q is a "low" logic level, but the switch 30 provides the quantity $\alpha|l|$ when Q is a "high" logic level.

The digital quantity h is also provided to a comparator 25, which compares h with a predetermined value $h_0$. The comparator 25 provides a "low" logic level when $h \leq h_0$, but provides a "high" logic level when $h < h_0$. The output of the absolute value circuit 23 is provided to a comparator 26, which compares the quantity $|l|$ with a predetermined value $l_1$. The comparator 26 provides a "low" logic level when $|l| \geq l_1$, but provides a "high" logic level when $|l| < l_1$. The output of the comparator 25 is connected to one input of a 2-input AND gate 28. The other input of the AND gate 28 is connected to the output of the comparator 26 through an inverter 27. The output of the AND gate 28 is received by a bias circuit 29, which provides a quantity b when the output of the AND gate 28 is at a "high" logic level. Otherwise, the bias circuit 29 provides a zero output. The outputs of comparators 25 and 26 are also connected to another 2-input AND gate 34.

The output of the switch 30 is received by an adder circuit 31 along with the output of the bias circuit 29. The adder circuit provides the sum of the outputs of the switch 30 and the bias circuit 29 to a switch 32, which is controlled by the output of a switch 33. The switch 33 receives the output of the comparator 21 and the signal g from the relative image displacement detection system, and is controlled by the output Q of the flip-flop 22. The switch 33 provides the signal g to control the switch 32 when Q is at a "low" logic level, but the switch 33 provides the output of the comparator 21 to control the switch 32 when Q is at a "high" logic level. The switch 32 provides the output of the adder circuit 31 on one of its output terminals OUT1 when the control signal from the switch 33 is a "low" logic level, but the switch 32 provides the output of the adder circuit 31 on the other of its output terminals OUT2 when the control signal from the switch 33 is a "high" logic level. The quantities provided on output terminals OUT1 and OUT2 of the switch 32 after appropriate conversion causes the servomotor to rotate in the clockwise and counterclockwise senses, respectively, by magnitudes specified by the quantities provided.

At the beginning of a focus operation, the flip-flop 22 is reset by means not shown in FIG. 9. Therefore, the switch 30 initially provides the quantity h to the adder circuit 31, and the switch 33 initially provides the g signal to control the switch 32. Assuming that the imaging system is initially out of focus, the quantity h is greater than $h_0$. Furthermore, the quanity l is positive, and the quantity $|1|$ is greater than $l_1$. Under these conditions the output of the AND gate 28 is at a "low" logic level, and the bias circuit 29 provides the quantity zero. Thus the quantity h is provided to one of the output terminals OUT 1 or OUT2, depending on the state of the g signal, and a focus adjustment is made solely under the control of the relative image displacement detection system. As the focus adjustment of the imaging system is being made, i.e., by moving the components of the optical system in a direction specified by the g signal, the quantity h decreases until it becomes smaller than the predetermined value of $h_0$. At that point the imaging system is considered to be in focus by the relative image displacement detection circuit, and the quantity h becomes too small to cause any further focus adjustments of the imaging system. However, the imaging system may not at that point be considered to be in focus by the image contrast detection system, since the quantity $|1|$ may still be greater than the predetermined value $l_1$. Under those conditions, where h is less than $h_0$ and $|1|$ is greater than or equal to $l_1$, the AND gate 28 provides a "high" logic level to cause the bias circuit 29 to provide the quantity b, which is added to the quantity h by the adder circuit 31. Consequently, the focus adjustment of the imaging system continues in the same direction, as if the quantity h were still greater than $h_0$, until the quantity l becomes negative signifying that the point of focus as determined by the image contrast detection system has been past. When the quantity l becomes negative, the flip-flop 22 is set and provides a "high" logic level, causing the switch 33 to provide the output of the comparator 21 and the switch 30 to provide the quantity $\alpha|1|$. Under these conditions, the focus adjustment of the imaging system proceeds solely under the control of the image contrast detection system, until the quantity $|1|$ becomes less than $l_1$. At that point the AND gate 34 provides a "high" logic level and the focusing operation is terminated.

Figure 10:
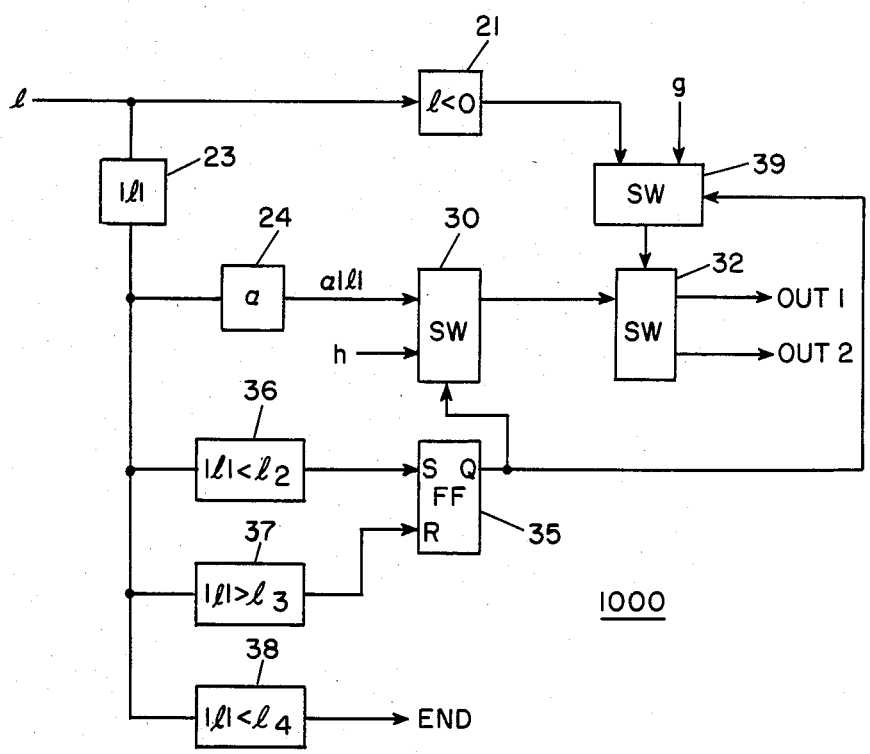
FIG. 10 is a schematic block diagram of an alternative configuration for a motor control circuit suitable for use in the automatic focusing apparatus of FIG. 8.

Turning now to FIG. 10, there is shown an alternative configuration 1000 for a motor control circuit suitable for use in the apparatus of FIG. 8. Reference numerals and characters used in FIG. 9 are again used in FIG. 10 to denote like components or parts of the circuit. As in the case of the circuit of FIG. 9, the quantity l from the image contrast detection system is received by a comparator 21 which provides a "low" logic level if $1 \geq 0$ and provides a "high" logic level if $1 < 0$, and to an absolute value circuit 23. The output of the absolute value circuit 23 is received by a scaling circuit 24 and by a comparator 36 which provides a "low" logic level if $|1| \geq l_2$, where $l_2$ is a first predetermined value, and a "high" logic level if $|1| < l_2$. The output of the absolute value circuit 23 is also received by a comparator 37 which provides a "high" logic level when $|1| > l_3$, where $l_3$ is a second predetermined quantity larger than $l_2$, and provides a "low" logic level when $|1| \leq l_3$. Furthermore, the output of the absolute value circuit 23 is received by a comparator 38 which provides a "low" logic level when $|1| \geq l_4$, where $l_4$ is a third predetermined quantity smaller than $l_2$, and provides a "high" logic level when $|1| < l_4$.

The output of the comparator 36 is received by the S input of an S-R flip-flop 35, which is set when a "high" logic level is received at the S input. The output of the comparator 37 is received by the R input of the flip-flop 35, which is reset when a "high" logic level is received by the R input. The output of the scaling circuit 24 is received by a switch 30 along with the quantity h from the relative image displacement detection system. The switch 30 is controlled by the output Q of the flip-flop 35 to provide the quantity h at its output when Q is at a "low" logic level and to provide the quantity $\alpha|1|$ when Q is at a "high" logic level. The output of switch 30 is received by a switch 32 which is controlled by the output of a switch 39. The switch 32 provides the output of the switch 30 to one of its two output terminals OUT1 and OUT2 depending on the logic level of the output of the switch 39. As described above, in connection with FIG. 9, the quantities provided on the outputs OUT1 and OUT2 after appropriate conversion are used to control the servomotor which adjusts the focus of the imaging system.

The switch 39 receives the output of the comparator 21 and the signal g, and is controlled by the output Q of flip-flop 35 to provide the signal g at its output when Q is a "low" logic level and to provide the output of the comparator 21 when Q is a "high" logic level.

At the beginning of a focusing operation, the quantity l is such that $|1| > l_3$, and the flip-flop 35 is reset by the output of the comparator 37. Consequently, the switch 30 provides the quantity h to the switch 32, and the switch 39 provides the signal g to control the switch 32. Under these conditions, the focus adjustment of the imaging system is solely under the control of the quantities g and h of the relative image displacement detection system.

As the focus is adjusted, the quantity l becomes smaller, and when $|1|$ becomes less than $l_2$, the flip-flop 35 is set by the output of the comparator 36. Thereafter, the switch 30 provides the quantity $\alpha|1|$ to the switch 32, and the switch 39 provides the output of the comparator 21 to control the switch 32. Under these conditions, focus adjustment of the imaging system continues solely under the control of the quantity l of the image contrast detection system.

It is understood that various alterations and modifications may be made to the disclosed embodiments by one skilled in the art without departing from the spirit and scope of the present invention. For example, other configurations of logical circuits will be known to one skilled in the art for performing substantially equivalent logical functions as the illustrative configurations described herein. Moreover, the logic circuitry of the FIGS. 6, 8, 9, and 10 may also be implemented in large part by an appropriately programmed processor rather than with special purpose hardwired logic as illustrated.

We claim:

1. An automatic focusing apparatus for an optical imaging system, which includes an optical system adapted to form an image of an object at a focal plane, the apparatus comprising:

relative image displacement detection means providing a first and a second digital quantity respectively indicative of the direction and magnitude of a focus alteration of the imaging system to achieve a state of focus therein;

image contrast detection means providing a third digital quantity indicative of the change in the contrast of an image formed by the imaging system as the focus thereof is altered;

focus altering means initially responsive to the first and second digital quantities for altering the focus of the imaging system in a direction indicated by the first digital quantity until the third digital quantity indicates a decrease in the contrast of the image with further focus alteration, the focus altering means being subsequently responsive to the third digital quantity for altering the focus of the imaging system until the magnitude of the third digital quantity is less than a first predetermined quantity.

2. An automatic focusing apparatus according to claim 1 wherein the focus altering means includes a servomotor and motor control means comprising:

first comparator means receiving the third digital quantity and responsive to the third digital quantity being less than zero for providing a first logic level, but otherwise providing a second logic level;

flip-flop means responsive to the first logic level provided by the first comparator means for storing and providing the first logic level;

absolute value means receiving the third digital quantity and providing the absolute value thereof;

scaling means receiving the absolute value of the third digital quantity and providing an output which is the product of the absolute value of the third digital quantity and a scale factor;

first switching means receiving the output of the scaling means and the second digital quantity, and responsive to the first logic level from the flip-flop means for providing an output which is the output of the scaling means, but otherwise providing an output which is the second digital quantity;

second comparator means receiving the second digital quantity and responsive to the second digital quantity being less than a second predetermined quantity for providing the first logic level, but otherwise providing the second logic level;

third comparator means coupled to the absolute value means and responsive to the absolute value of the third digital quantity being less than the first predetermined quantity for providing the first logic level, but otherwise providing the second logic level;

inverter means responsive to the third comparator means for providing the complement thereof;

first gating means responsive to the second comparator means and the inverter means for providing the AND logic function thereof;

second gating means responsive to the second and third comparator means for providing the AND logic function thereof;

bias means responsive to the first gating means providing the first logic level for producing a fourth digital quantity;

adder means receiving the output of the first switching means and the fourth digital quantity and providing an output which is the sum thereof;

second switching means receiving the output of the first comparator means and the first digital quantity, and responsive to the first logic level from the flip-flop means for providing an output which is the output of the first comparator means, but otherwise providing an output which is the first digital quantity; and third switching means receiving the output of the adder means and responsive to the output of the second switching means being the first logic level for providing the output of the adder means on first terminal means but otherwise providing the output of the adder means on second terminal means, the servomotor being responsive to the first terminal means of the third switching means for altering the focus of the imaging system in a first direction and being responsive to the second terminal means of the third switching means for altering the focus of the imaging system in a second direction.

3. An automatic focusing apparatus according to claim 1 wherein the focus altering means includes a servomotor and motor control means comprising;

first comparator means receiving the third digital quantity, and responsive to the third digital quantity being less than zero for providing a first logic level, but otherwise providing a second logic level;

absolute value means receiving the third digital quantity and providing the absolute value thereof;

scaling means receiving the absolute value of the third digital quantity and providing an output which is the product of the absolute value of the third digital quantity and a scale factor;

second comparator means responsive to the absolute value of the third digital quantity being less than a third predetermined quantity for providing the first logic level, but otherwise providing the second logic level;

third comparator means responsive to the absolute value of the third digital quantity being greater than a fourth predetermined quantity for providing the first logic level, but otherwise providing the second logic level;

fourth comparator means responsive to the absolute value of the third digital quantity being less than the first predetermined quantity for providing the first logic level, but otherwise providing the second logic level;

flip-flop means coupled to the second and third comparator means, and responsive to the first logic level from the second comparator means for storing and providing the first logic level, and responsive to the first logic level from the third comparator means for storing and providing the second logic level;

first switching means receiving the output from the scaling means and the second digital quantity, and responsive to the first logic level from the flip-flop means for providing an output which is the output from the scaling means but otherwise providing an output which is the second digital quantity;

second switching means receiving the output of the first comparator means and the first digital quantity, and responsive to the first logic level from the flip-flop means for providing an output which is the output of the first comparator means, but otherwise providing an output which is the first digital quantity; and third switching means receiving the output of the first switching means, and responsive to the output of the second switching means being the first logic level for providing the output of the first switching means on first terminal means, but otherwise providing the output of the first switching means on second terminal means, the servo motor being responsive to the first terminal means of the third switching means for altering the focus of the imaging system in a first direction and being responsive to the second terminal means of the third switching means for altering the focus of the imaging system in a second direction.

4. An automatic focusing apparatus according to claim 2 wherein the image contrast detection means comprises:

a plurality of detector/converters means arranged in an array in the focal plane, each for sensing the light intensity of a respective portion of the image and providing a pulse signal having a pulse-width related to the sensed light intensity;

first means responsive to the pulse signals provided by the plurality of detector/converter means for providing a digital code indicative of the difference between the maximum and minimum pulse-widths of the pulse signals; and second means including first register means for storing the digital code indicative of the difference between the maximum and minimum pulse-widths of the pulse signals during a first interval; second register means for storing the digital code indicative of the difference between the maximum and minimum pulse-widths of the pulse signals during an earlier interval; comparator means for comparing the digital codes stored in the first and second register means, for providing the first digital quantity representative of the difference between the digital codes in the first and second register means, and for causing the second register means to store the larger of the digital codes stored in the first and second register means.

5. An automatic focusing apparatus according to claim 2 wherein the image contrast detection means comprises:

a plurality of photosensor means arranged in an array in the focal plane, each for sensing the light intensity of a respective portion of the image and providing a voltage signal related to the sensed light intensity;

first means responsive to the voltage signals provided by the plurality of photosensors for providing a digital code representative of the standard deviation of the voltage signals; and second means including first register means for storing the digital code representative of the standard deviation of the voltage signals during a first interval; second register means for storing the digital code representative of the standard deviation of the voltage signals during an earlier interval; comparator means for comparing the digital codes stored in the first and second register means, for providing the first digital quantity representative of the difference between the digital codes in the first and second register means, and for causing the second register means to store the larger of the digital codes stored in the first and second register means.

6. An automatic focusing apparatus according to claim 4 wherein the relative image displacement focus detection means comprises:

a first and a second optical system each adapted to form an image of an object at a first and a second focal plane, respectively, each of the first and second optical systems having an optical axis, the first and second optical systems receiving light from the object through a first and a second optical path, respectively, the second optical path forming an angle with respect to the optical axis of the second optical system;

a first and a second image sensing array situated in the first and second focal planes, respectively, each array having a plurality of photosensors, each photosensor for sensing the light intensity in a respective portion of the focal plane in which the photosensor is situated and providing a voltage signal related to the sensed light intensity;

detection circuit means responsive to the voltage signals from the photosensors of each array for detecting the relative displacement of the images in the first and second focal planes and providing a signal indicative of the relative displacement detected;

means responsive to the signal from the detection circuit means for altering the angle between the second optical path and the optical axis of the second optical system for reducing the relative displacement of the images in the first and second focal planes, and providing the first and the second digital quantities indicative of the direction and magnitude of the angle alteration, respectively.

7. An automatic focusing apparatus according to claim 3 wherein the image contrast detection means comprises:

a plurality of detector/converters means arranged in an array in the focal plane, each for sensing the light intensity of a respective portion of the image and providing a pulse signal having a pulse-width related to the sensed light intensity;

first means responsive to the pulse signals provided by the plurality of detector/converter means for providing a digital code indicative of the difference between the maximum and minimum pulse-widths of the pulse signals; and second means including first register means for storing the digital code indicative of the difference between the maximum and minimum pulse-widths of the pulse signals during a first interval; second register means for storing the digital code indicative of the difference between the maximum and minimum pulse-widths of the pulse signals during an earlier interval; comparator means for comparing the digital codes stored in the first and second register means, for providing the first digital quantity representative of the difference between the digital codes in the first and second register means, and for causing the second register means to store the larger of the digital codes stored in the first and second register means.

8. An automatic focusing apparatus according to claim 3 wherein the image contrast detection means comprises:
   a plurality of photosensor means arranged in an array in the focal plane, each for sensing the light intensity of a respective portion of the image and providing a voltage signal related to the sensed light intensity;
   first means responsive to the voltage signals provided by the plurality of photosensors for providing a digital code representative of the standard deviation of the voltage signals; and
   second means including first register means for storing the digital code representative of the standard deviation of the voltage signals during a first interval; second register means for storing the digital code representative of the standard deviation of the voltage signals during an earlier interval; comparator means for comparing the digital codes stored in the first and second register means, for providing the first digital quantity representative of the difference between the digital codes in the first and second register means, and for causing the second register means to store the larger of the digital codes stored in the first and second register means.

9. An automatic focusing apparatus according to claim 7 wherein the relative image displacement focus detection means comprises:
   a first and a second optical system each adapted to form an image of an object at a first and a second focal plane, respecively, each of the first and second optical systems having an optical axis, the first and second optical systems receiving light from the object through a first and a second optical path, respectively, the second optical path forming an angle with respect to the optical axis of the second optical system;
   a first and a second image sensing array situated in the first and second focal planes, respectively, each array having a plurality of photosensors, each photosensor for sensing the light intensity in a respective portion of the focal plane in which the photosensor is situated and providing a voltage signal related to the sensed light intensity;
   detection circuit means responsive to the voltage signals from the photosensors of each array for detecting the relative displacement of the images in the first and second focal planes and providing a signal indicative of the relative displacement detected;
   means responsive to the signal from the detection circuit means for altering the angle between the second optical path and the optical axis of the second optical system for reducing the relative displacement of the images in the first and second focal planes, and providing the first and the second digital quantities indicative of the direction and magnitude of the angle alteration, respectively.

* * * * *